(12) United States Patent
Nonaka et al.

(10) Patent No.: US 10,927,428 B2
(45) Date of Patent: *Feb. 23, 2021

(54) HOT-DIP GALVANIZED STEEL SHEET AND MANUFACTURING METHOD THEREOF

(71) Applicant: NIPPON STEEL CORPORATION, Tokyo (JP)

(72) Inventors: Toshiki Nonaka, Tokyo (JP); Toshio Ogawa, Tokyo (JP); Nobuhiro Fujita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,032

(22) Filed: Mar. 18, 2019

(65) Prior Publication Data

US 2019/0211412 A1  Jul. 11, 2019

Related U.S. Application Data

(63) Continuation of application No. 13/993,581, filed as application No. PCT/JP2011/079045 on Dec. 15, 2011, now Pat. No. 10,280,475.

(30) Foreign Application Priority Data

Dec. 17, 2010 (JP) ................................ 2010-281690

(51) Int. Cl.

| | |
|---|---|
| *C21D 8/02* | (2006.01) |
| *B32B 15/01* | (2006.01) |
| *C21D 9/46* | (2006.01) |
| *C23C 2/02* | (2006.01) |
| *C23C 2/06* | (2006.01) |
| *C22C 38/18* | (2006.01) |
| *C22C 38/22* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C23C 2/26* | (2006.01) |
| *C23C 2/28* | (2006.01) |

(52) U.S. Cl.
CPC .......... *C21D 8/0226* (2013.01); *B32B 15/013* (2013.01); *C21D 8/0278* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/18* (2013.01); *C22C 38/22* (2013.01); *C23C 2/02* (2013.01); *C23C 2/06* (2013.01); *C23C 2/26* (2013.01); *C23C 2/28* (2013.01); *C21D 8/0236* (2013.01); *C21D 8/0263* (2013.01); *C21D 8/0273* (2013.01); *C21D 2211/005* (2013.01); *C21D 2211/008* (2013.01); *Y10T 428/12799* (2015.01)

(58) Field of Classification Search
CPC combination set(s) only.
See application file for complete search history.

(56) References Cited

U.S. PATENT DOCUMENTS

| | | | |
|---|---|---|---|
| 7,922,835 B2 | 4/2011 | Nonaka et al. | |
| 8,076,008 B2 | 12/2011 | Kaneko et al. | |
| 2004/0238082 A1* | 12/2004 | Hasegawa | C22C 38/04 148/652 |
| 2008/0000555 A1 | 1/2008 | Nonaka et al. | |
| 2009/0071575 A1* | 3/2009 | Sun | C22C 38/18 148/537 |
| 2010/0112377 A1* | 5/2010 | Kaneko | C22C 38/001 428/659 |

(Continued)

FOREIGN PATENT DOCUMENTS

| | | |
|---|---|---|
| CA | 2697226 A1 | 4/2009 |
| CA | 2718304 A1 | 10/2009 |
| CA | 2720702 A1 | 10/2009 |

(Continued)

OTHER PUBLICATIONS

Canadian Office Action and Search Report for corresponding Canadian Application No. 2,821,703, dated Feb. 3, 2015.
Chinese Office Action dated Aug. 13, 2014, issued in Chinese Patent Application No. 201180060228.4.
De Cosmo et al., "Design of process parameters for dual phase steel production with strip rolling using the finite-element method," Journal of Materials Processing Technology, vol. 92-93, Aug. 1, 1999, pp. 486-493.
Extended European Search Report, dated Oct. 27, 2016, for European Application No. 11847906.2.
International search report issued in PCT/JP2011/079045 dated Mar. 13, 2012.

(Continued)

*Primary Examiner* — Jenny R Wu

(74) *Attorney, Agent, or Firm* — Birch, Stewart, Kolasch & Birch, LLP

(57) ABSTRACT

A hot-dip galvanized steel sheet includes a steel sheet and a hot-dip galvanized layer arranged on the steel sheet, in which the Si content and the Al content by mass % of components of the steel sheet satisfy a relationship 0.5<Si+Al<1.0, and a metallographic structure of the steel sheet satisfies a relationship of $\{(n_2)^{2/3} \times d_2\}/\{(n_1)^{2/3} \times d_1\} \times \ln(H_2/H_1) < 0.3$ when the $n_1$ is the number of a MnS of a surface portion of the steel sheet, the $d_1$ μm is an average equivalent circle diameter of the MnS in the surface portion of the steel sheet, the $H_1$ GPa is a hardness of a martensite of the surface portion of the steel sheet, the $n_2$ is the number of the MnS of a center portion of the steel sheet, the $d_2$ μm is an average equivalent circle diameter of the MnS in the center portion of the steel sheet, and the $H_2$ GPa is the hardness of the martensite of the center portion of the steel sheet.

8 Claims, 2 Drawing Sheets

(56) References Cited

U.S. PATENT DOCUMENTS

2010/0247957 A1  9/2010  Hoshika et al.

FOREIGN PATENT DOCUMENTS

| | | | |
|---|---|---|---|
| CA | 2751411 | A1 | 9/2010 |
| CN | 101646797 | A | 2/2010 |
| EP | 2098600 | A1 | 9/2009 |
| JP | 2003-239040 | A | 8/2003 |
| JP | 2004-308002 | A | 11/2004 |
| JP | 2005-256141 | A | 9/2005 |
| JP | 2006-274317 | A | 10/2006 |
| JP | 2007-70659 | A | 3/2007 |
| JP | 2007-138262 | A | 6/2007 |
| JP | 2008-240123 | A | 10/2008 |
| JP | 2010-236052 | A | 10/2010 |
| TW | 200940722 | A1 | 10/2009 |
| WO | WO 2004/113580 | A1 | 12/2004 |
| WO | WO 2008/123561 | A1 | 10/2008 |
| WO | WO-2008123561 | A1 * | 10/2008 ............. C22C 38/06 |

OTHER PUBLICATIONS

Taiwanese Office Action for Taiwanese Application No. 100146818, dated Jul. 22, 2013, with English translation.
The Iron and Steel Institue of Japan Kyodo Kenkyukai Atsuen Rironbukai, Ita Atsuen no Riron to Jissai, The Iron and Steel Institute of Japan, Sep. 1, 1984, pp. 295-299.
Final Rejection dated Jan. 16, 2018, issued in U.S. Appl. No. 13/993,581.
Final Rejection dated Jul. 11, 2016, issued in U.S. Appl. No. 13/993,581.
Non-Final Rejection dated Jan. 13, 2016, issued in U.S. Appl. No. 13/993,581.
Non-Final Rejection dated Jun. 14, 2017, issued in U.S. Appl. No. 13/993,581.
Non-Final Rejection dated Jun. 22, 2018, issued in U.S. Appl. No. 13/993,581.
Notice of Allowability dated Dec. 19, 2018, issued in U.S. Appl. No. 13/993,581.
Restriction Requirement dated Oct. 20, 2015, issued in U.S. Appl. No. 13/993,581.

* cited by examiner

HOT-DIP GALVANIZED STEEL SHEET AND MANUFACTURING METHOD THEREOF

This is a Continuation of application Ser. No. 13/993,581 filed on Jun. 12, 2013, which is the U.S. National Phase of PCT/JP2011/079045, filed Dec. 15, 2011, which claims priority under 35 U.S.C. 119(a) to Japanese Patent Application No. 2010-281690, filed Dec. 17, 2010, the contents of all of which are incorporated by reference, in their entirety, into the present application

TECHNICAL FIELD

An embodiment of the present invention relates to a hot-dip galvanized high strength steel sheet having improved formability and a manufacturing method thereof. The hot-dip galvanized high strength steel sheet also includes a galvannealed high strength steel sheet.

Priority is claimed on Japanese Patent Application No. 2010-281690, filed Dec. 17, 2010, the content of which is incorporated herein by reference.

BACKGROUND ART

The strength increase (high tension) of a steel sheet used is one of the most effective methods to achieve both weight saving and a collision safety for a vehicle body. Recently, a regulation regarding the collision safety represented by Euro-N-CAP has been stricter. In order to correspond to the regulation, addition of a stiffened member or the like is required, and thus, an increase in body weight is unavoidable. The increase in body weight results in a decrease in fuel efficiency. Accordingly, the increase in a utilization of an ultra-high strength material, in which a thickness is capable of being thinned while a strength of a part is maintained, has been more preferable. On the other hand, in order to achieve the weight saving of the part as much as possible, a shape of the part becomes complicated. Thereby, further improvement of forming workability is required in the steel sheet. Particularly, in most cases, a high strength thin steel sheet is applied to a portion, in which bending deformation is mainly performed, such as a side sill. Accordingly, it is important to estimate a hole expansibility which is an index indicating a bendability or local ductility as formability of the high strength thin steel sheet. Moreover, since corrosion resistance is also required in the member, a hot-dip galvanizing or a galvannealing is applied to the high strength steel sheet used.

However, in general, if the strength of the steel sheet is increased, it is known that the forming workability such as the bendability or the hole expansibility is deteriorated.

For example, in the related art, steel sheets having improved the hole expansibility are suggested in Patent Documents 1 to 3.

Since the high strength steel sheet has much content of an alloying element and the alloying element is concentrated in a center portion of a sheet thickness, the hole expansibility is deteriorated. However, there is no related art which discloses a hardness difference between a surface portion of the steel sheet and a center portion of the steel sheet. Moreover, since a MnS having a large size becomes a fracture origin at the time of molding, it is assumed that a precipitation state of the MnS influences formability. However, there is no related art which discloses the precipitation state of the MnS.

PRIOR ART DOCUMENT

[Patent Document]
[Patent Document 1] Japanese Unexamined Patent Application, First Publication No. 2005-256141
[Patent Document 2] Japanese Unexamined Patent Application, First Publication No. 2006-274317
[Patent Document 3] Japanese Unexamined Patent Application, First Publication No. 2008-240123

DISCLOSURE OF THE INVENTION

Problem that the Invention is to Solve

An object of an embodiment of the present invention is to solve the problems of the related art as described above, and to provide a hot-dip galvanized steel sheet having high strength and improved formability and a manufacturing method thereof.

Means for Solving the Problems

The inventors eagerly reviewed a hot-dip galvanized high strength steel sheet having improved formability.

As a result, with respect to a steel sheet which is a DP (Dual Phase) steel having relatively low yield stress in high strength steel sheets and becomes a substrate of a hot-dip galvanized steel sheet, by controlling a total amount of a Si and a Al, which are components of the steel sheet, to a specific range and by controlling a hardness distribution of the steel sheet, the inventors found that a hot-dip galvanized high strength steel sheet is capable of obtaining more formability than the related art could be industrially manufactured.

In order to prevent problems such as a delayed fracture or secondary working embrittlement, it is preferable that the steel sheet be a DP steel which substantially does not include a residual austenite except for the residual austenite of approximately 5% by volume which is inevitably included.

Moreover, in the surface portion of the steel sheet and the center portion of the steel sheet, it is important to control the hardness of the martensite or the precipitation state of the MnS in the steel sheet.

The aspect of the present invention may be applied to a hot-dip galvanized high strength steel sheet having a tensile strength of 590 MPa to 1500 MPa. However, remarkable effects are exerted on the hot-dip galvanized high strength steel sheet having the tensile strength of approximately 980 MPa.

The gist of the present invention is as follows.

(1) According to an embodiment of the present invention, there is provided a hot-dip galvanized steel sheet including: a steel sheet; and a hot-dip galvanized layer arranged on the steel sheet, wherein a component of the steel sheet includes, by mass %, C: 0.05% to 0.13%, Si: 0.2% to 0.8%, Mn: 1.5% to 3.1%, P: 0.001% to 0.06%, S: 0.001% to 0.01%, N: 0.0005% to 0.01%, and Al: 0.1% to 0.7%, wherein the balance consisting of Fe and unavoidable impurities, wherein a Si content and an Al content by mass % satisfy the following Equation A, wherein a metallographic structure of the steel sheet includes a ferrite and a martensite, and wherein the metallographic structure satisfies the following Equation B when the number of a MnS per 0.1 mm$^2$ on a surface portion of the steel sheet which is a region of $\frac{1}{8}$ to $\frac{2}{8}$ in a sheet thickness direction is $n_1$, an average equivalent circle diameter of the MnS on the surface portion of the steel sheet is $d_1$ μm, a hardness of the martensite of the surface portion of the steel sheet is $H_1$ GPa, the number of the MnS per 0.1 mm² on a center portion of the steel sheet which is a region of 3/8 to 5/8 in the sheet thickness direction is $n_2$, an average equivalent circle diameter of the MnS on the center portion of the steel sheet is $d_2$ μm, and the hardness of the martensite in the center portion of the steel sheet is $H_2$ GPa.

$$0.5 < Si + Al < 1.0 \quad \text{(Equation A)}$$

$$\{(n_2)^{2/3} \times d_2\}/\{(n_1)^{2/3} \times d_1\} \times \ln(H_2/H_1) < 0.3 \quad \text{(Equation B)}$$

(2) In the hot-dip galvanized steel sheet according to (1), the component of the steel sheet may further include by mass % at least one of B: 0.0005% to 0.002%, Mo: 0.01% to 0.5%, Cr: 0.01% to 0.5%, V: 0.001% to 0.1%, Ti: 0.001% to 0.1%, Nb: 0.001% to 0.05%, Ca: 0.0005% to 0.005%, and Rare Earth Metal: 0.0005 to 0.005%.

(3) In the hot-dip galvanized steel sheet according to (2), the steel sheet may be a cold rolled steel sheet.

(4) In the hot-dip galvanized steel sheet according to (1), the steel sheet may be a cold rolled steel sheet.

(5) In a manufacturing method of the hot-dip galvanized steel sheet according to any one of (1) to (4), when a total number of stands in a hot finish rolling is n stage and $r_i$% is a rolling reduction of the $i^{th}$ stand, the hot finish rolling may satisfy the following Equation C.

$$(r_1 + r_2 + r_3)/(r_{n-2} + r_{n-1} + r_n) > 1.6 \quad \text{(Equation C)}.$$

Advantage of the Invention

According to the hot-dip galvanized steel sheet related to the aspect of the present invention and the manufacturing method thereof, by controlling a total amount of the Si and the Al which are components of the steel sheet, to a specific range, and further by controlling the hardness of the martensite and the precipitation state of the MnS of the steel sheet in the steel sheet which becomes a substrate of the hot-dip galvanized steel sheet, a hot-dip galvanized steel sheet having the high strength and improved formability and a manufacturing method thereof is capable of being provided.

EMBODIMENT OF THE INVENTION

Figure 1:
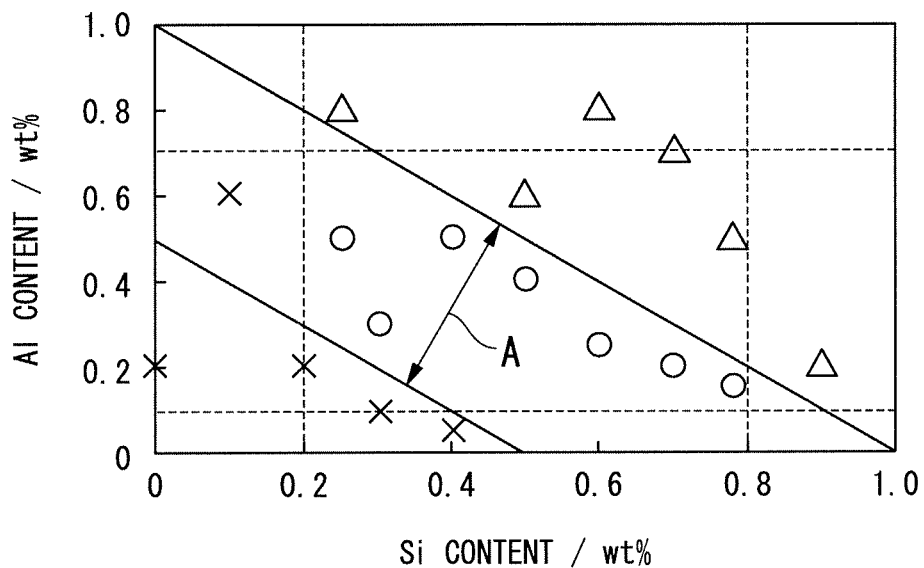
FIG. 1 is a view showing a relationship between contents of the Al and the Si in a steel sheet and steel sheet characteristics such as formability or a plating property.

A hot-dip galvanized steel sheet according to an embodiment of the present invention includes a steel sheet which becomes a substrate and a hot-dip galvanized layer arranged on the steel sheet. Here, the hot-dip galvanizing also includes a galvannealing.

First, a numerical limit range regarding the base elements of the steel sheet which becomes a substrate and the reasons for the limit will be described. Here, the described % is mass %.

C: 0.05% to 0.13%

C (carbon) is an essential element in order to secure a strength and stabilize a martensite.

When the C content is less than 0.05%, the strength is not satisfied, and the martensite is not formed. Moreover, when the C content exceeds 0.13%, a hardness of the martensite becomes too high, a hardness difference between a soft phase and the martensite becomes too large, and thus, a hole expansibility is decreased, and the weldability is deteriorated.

Therefore, the C content is 0.05% to 0.13%, and is preferably 0.06% to 0.1%.

Si: 0.2% to 0.8%

Si (silicon) is an element which is added in order to secure the strength and a ductility.

When the Si content exceeds 0.8%, a phosphatability or a galvanizability is deteriorated. Accordingly, the Si content is set to 0.8% or less. Moreover, when the galvanizability is emphasized, the Si content is preferably 0.6% or less. Furthermore, the hole expansibility is improved due to multiple addition of Si and Al. However, when the Si content is less than 0.2%, the effect does not remarkably appear. Therefore, a lower limit of the Si content is 0.2%.

Mn: 1.5% to 3.1%

Mn (manganese) is an element which delays a generation of a carbide and stabilizes a ferrite in addition to securing the strength.

When the Mn content is less than 1.5%, strength is not satisfied, a formation of the ferrite is insufficient, and thus, the ductility is deteriorated. Moreover, when the Mn content exceeds 3.1%, the hardenability is increased more than necessary, and thus, the product quality is not stabilized. Furthermore, the ductility is also deficient.

Accordingly, the Mn content is 1.5% to 3.1%, and is preferably 1.8% to 2.8%.

P: 0.001% to 0.06%

P (phosphorus) is added as an element which increases the strength of the steel sheet, if necessary. However, if the additional amount of P is increased, an intergranular segregation occurs, and thus, local ductility and the weldability is deteriorated.

Accordingly, an upper limit of the P content is 0.06%. Moreover, a lower limit of the P content is 0.001%, the reason is because costs are increased on steel making process, if the P content is less than 0.001%. Preferably, the P content is 0.003% to 0.03%.

Al: 0.1% to 0.7%

Al (aluminum) is an element which promotes the generation of the ferrite and effectively acts on improvement of the ductility. In addition, Al is an element which does not deteriorate the phosphatability or the galvanizability, even if the additional amount of Al is large.

In order to improve the hole expansibility by a multiple addition of Si and Al, the Al content is 0.1% or more. However, if the additional amount of Al is increased, and causes the increase of inclusions such as an alumina, accordingly, the workability is deteriorated. Therefore, an upper limit of the Al content is 0.7%. Preferably, the upper limit is 0.15% to 0.6%.

In addition to the above-described base elements, the steel sheet may further include at least one of B, Mo, Cr, V, Ti, Nb, Ca, and Rare Earth Metal (REM) as selective elements. Hereinafter, the numerical limit ranges of the selective elements and the reasons for the limit will be described. Here, the described % is mass %.

B: 0.0005% to 0.002%

B (boron) may be added in order to secure the hardenability and increase effective Al due to a formation of BN. Moreover, the fraction of ferrite of DP steel is increased, and thus, a high elongation is capable of being secured. However, the metallographic structure is a laminated structure, and thus, the local ductility may be decreased. Due to addition of B, an aforementioned phenomenon is capable being prevented.

When the B content is less than 0.0005%, the effects are not exerted. When the B content exceeds 0.002%, the effects corresponding to the added amount are not exhibited.

Mo: 0.01% to 0.5%

Cr: 0.01% to 0.5%

Mo (molybdenum) and Cr (chromium) may be added so as to secure the strength and the hardenability.

When the Mo content and the Cr content are less than 0.01%, the effects are not exerted. When the Mo content and the Cr content exceed 0.5%, a ferrite generation is suppressed in the DP steel, and thus, the ductility is deteriorated.

Moreover, the phosphatability or the galvanizability is deteriorated.

V: 0.001% to 0.1%

Ti: 0.001% to 0.1%

V (vanadium) and Ti (titanium) may be added so as to secure the strength.

When the V content and the Ti content are less than 0.001%, the effects are not exerted. When the V content and the Ti content exceed 0.1%, the weldability or the like is deteriorated.

Nb: 0.001% to 0.05%

Nb (niobium) may be added so as to secure the strength.

When the Nb content is less than 0.001%, the effects are not exerted. When the Nb content exceeds 0.05%, the effects are saturated.

Ca: 0.0005% to 0.005%

REM: 0.0005% to 0.005%

Ca (calcium) and REM may be added to suppress the generation of inclusions and to improve the hole expansibility.

When the Ca content and the REM content are less than 0.0005%, the effects are not exerted. When the Ca content and the REM content exceed 0.005%, the effects are saturated.

In addition to the elements, the steel sheet includes unavoidable impurities. Here, the unavoidable impurities show an auxiliary raw material such as steel scrap or elements such as S, N, Mg, Pb, Sb, Sn, Cd, Ni, or Cu which is inevitably mixed in a plating process.

For example, even when Sn or the like is included within a range of 0.01% or less, the effects of the present invention are not reduced. However, in order to sufficiently exert the effects of the present invention, it is preferable that the S content and the N content be limited as follows. Here, the described % is mass %.

S: 0.001% to 0.01%

S (Sulfur) is an element that unwelcomes to exist in the steel. S generates MnS, and thus, the local ductility and the weldability are deteriorated by it.

Accordingly, an upper limit of the S content is limited to 0.01%. Moreover, since costs in the steel making process are increased, if S is decreased in an unnecessary manner. Thus, a lower limit of the S content is 0.001%. Preferably, the S content is 0.002% to 0.005%.

N: 0.0005% to 0.01%

N (nitrogen) is an element which is inevitably included. However, if too much N is included, not only aging properties are deteriorated but also an amount of an AlN precipitation is increased, and thus, the effects of Al addition are decreased.

Accordingly, an upper limit of the N content is limited to 0.01% or less. Moreover, if the N content is decreased in an unnecessary manner, since costs in the steel making process are increased, a lower limit of the N content is 0.0005% or more. Preferably, the N content is 0.001% to 0.005%.

Next, the numerical limit range regarding the total content of Si and Al will be described.

In order to increase the strength of the steel sheet, utilizations of only solid solution hardening or precipitation strengthening is insufficient, generally, in many cases, transformation strengthening is also used. Furthermore, since the controlling of a DP structure making, high elongation is obtained due to a soft ferrite phase, and the strength is secured due to a hard martensite phase.

However, in a case of the DP steel, if a hardness difference between the soft phase and the hard phase is increased, it is known that the hole expansibility is deteriorated. In order to improve this, there is a method which produces the decrease in hardness by tempering the martensite. However, the method is not sufficient enough. Particularly, in the DP steel which requires the tensile strength of 980 MPa or more, the strength may be deficient due to the tempering.

Thus, the inventors eagerly reviewed, and as a result, found that a steel sheet which has high strength and improved hole expansibility is obtained when the total amount of Si and Al by mass % satisfies the following Equation A.

$$0.5<Si+Al<1.0 \qquad \text{(Equation A)}$$

In evaluation of the strength and the formability, a value of $\lambda \times TS$, which is the product of a hole expansion ratio: $\lambda(\%)$ and the tensile strength: TS (MPa), is used. Generally, the value is approximately 40,000% MPa. When the value of $\lambda \times TS$ is 60,000% MPa or more, it determined that the steel sheet has the high strength and improved formability. FIG. 1 shows a relationship between the amounts of Al and Si by mass %, and steel sheet characteristics such as the formability or coating performance. In FIG. 1, a steel sheet in which the value of $\lambda \times TS$ is 60,000% MPa or more is represented by "○", a steel sheet in which the value of $\lambda \times TS$ is less than 60,000% MPa is represented by "X", and a steel sheet in which the galvanizability is deteriorated is represented by "Δ". Furthermore, a range indicated by the Equation A is represented by an arrow "A". As shown in FIG. 1, if the value of Si+Al by mass % is 0.5% or less, the value of $\lambda \times TS$ is not sufficient, and if the value of Si+Al is 1.0% or more, the galvanizability is deteriorated. In this way, the value of Si+Al by mass % is needed to be more than 0.5% and less than 1.0%. Preferably, the value of Si+Al by mass % is more than 0.6% and less than 1.0%.

Next, the metallographic structure of the steel sheet, which becomes a substrate of the hot-dip galvanized steel sheet according to the embodiment of the present invention, will be described.

In the metallographic structure of the steel sheet, the ferrite and the martensite are mainly included. This is because the steel sheet has improved balance between the strength and the ductility. Here, the ferrite includes a polygonal ferrite and a bainitic ferrite, and the martensite also includes a martensite obtained by performing tempering at a temperature of 600° C. or less in addition to a martensite obtained by general quenching. Even when the steel sheet subjected to tempering at the temperature of 600° C. or less is used as the substrate of the hot-dip galvanized steel sheet, the effects of the present invention are not changed.

The fraction of ferrite and the fraction of martensite are controlled according to the strength of the steel sheet. When TS is 500 MPa to 800 MPa, it is preferable that the fraction of the ferrite be 50 area % to 90 area % and the fraction of the martensite be 10 area % to 40 area %. When TS is 800 MPa to 1100 MPa, it is preferable that the fraction of the ferrite be 20 area % to 60 area % and the fraction of the martensite be 30 area % to 60 area %. When TS exceeds 1100 MPa, it is preferable that the fraction of the ferrite be 30 area % or less and the fraction of the martensite be 40 area % or more.

The steel sheet includes a bainite as the structure in addition to the ferrite and the martenste. It is preferable that the fraction of bainite be 10 area % to 40 area %. Moreover, if an austenite remains in the structure, secondary working embrittlement or delayed fracture characteristics are deteriorated. Accordingly, it is preferable that residual austenite be not substantially included in the steel sheet except for residual austenite of approximately 5 volume % which inevitably exists.

In order to obtain high strength and sufficient hole expansibility (formability) in the steel sheet, the condition of the metallographic structure is needed to satisfy the following Equation B.

$$\{(n_2)^{2/3} \times d_2\}/\{(n_1)^{2/3} \times d_1\} \times \ln(H_2/H_1) < 0.3 \quad \text{(Equation B)}$$

Here, the number of a MnS per 0.1 mm² on a surface portion of the steel sheet which is a region of ⅛ to ⅜ in a sheet thickness direction is $n_1$, an average equivalent circle diameter of the MnS is $d_1$ (m) and a hardness of the martensite of the surface portion of the steel sheet is $H_1$ (GPa). Similarly, the number of the MnS per 0.1 mm² on a center portion of the steel sheet which is a region of ⅜ to ⅝ in the sheet thickness direction is $n_2$, the average equivalent circle diameter of the MnS is $d_2$ (μm), and the hardness of the martensite in the center portion of the steel sheet is $H_2$ (GPa).

The left side of the Equation B being less than 0.3 shows that the difference of the numbers of the MnS, the difference of the average equivalent circle diameters of the MnS, and the difference of martensite hardness in the surface portion of the steel sheet and the center portion of the steel sheet are qualitatively small. Generally, the values of the number of the MnS, the average equivalent circle diameter of the MnS, and the martensite hardness in the center portion of the steel sheet are larger than those in the surface portion of the steel sheet, and thus, the left side of the Equation B becomes 0.3 or more.

Figure 2:
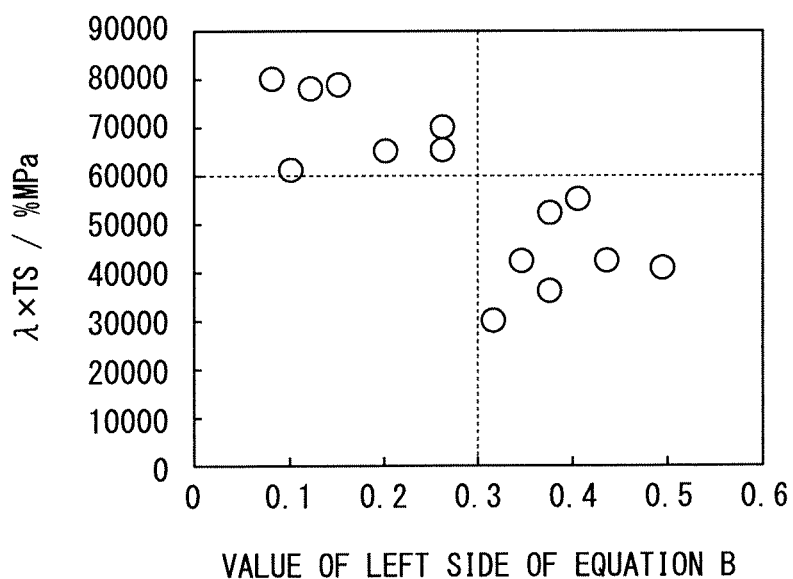
FIG. 2 is a view showing a relationship between a value of the left side of an Equation B, which represents a hardness of a martensite and a precipitation state of a MnS in a surface portion of the steel sheet and in a center portion of the steel sheet, and a value of λ×TS which estimates the strength and the formability of the steel sheet.

As shown in FIG. 2, there is a correlation between the value of the left side of the Equation B and the value of λ×TS. When the value of the left side of the Equation B is less than 0.3, the value of λ×TS becomes 60,000% MPa or more. In this way, in order to obtain high strength and improved formability in the steel sheet, the value of the left side of the Equation B is needed to be less than 0.3. Moreover, the lower limit of the Equation B which is assumed to be in general conditions is 0.01.

The hardness of the martensite and the precipitation state of the MnS in the steel sheet are capable of being controlled by a manufacturing method described below. Furthermore, in order to more precisely control the hardness of the martensite and the precipitation state of the MnS in the steel sheet, it is preferable that the steel sheet be a cold rolled steel sheet in which cold rolling is also performed after hot rolling.

Moreover, if a value of EL×TS, which is the product of the elongation (EL) and TS, is 16,000% MPa or more, since the formability is further improved, it is preferable that the value be 16,000% MPa or more.

As described above, by controlling the component and the metallographic structure of the steel sheet in the steel sheet which becomes the substrate of the hot-dip galvanized steel sheet, the hot-dip galvanized high strength steel sheet having high strength and improved formability are capable of being obtained.

Next, a manufacturing method of the hot-dip galvanized steel sheet according to the embodiment of the present invention will be described.

The manufacturing method may be performed by processes of a hot rolled steel sheet, a cold rolled steel sheet, and a plating steel sheet which are performed generally.

In a casting process, steel products are manufactured by casting of molten steel which satisfies the base elements, the selective elements, and the unavoidable impurities described above. The casting method is not particularly limited, and a vacuum casting method, a continuous casting method, or the like may be used.

In the hot rolling process, the hot rolling is performed by heating the steel products. In order to prevent a decrease of the workability due to apply of a strain to ferrite grains excessively, a finish rolling in the hot rolling is preferably performed at temperature of Ar₃ (the temperature in which ferrite transformation starts at the time of cooling) or more. Moreover, since a recrystallized grain diameter after annealing coarsens more than necessary at too high temperature, the finish rolling in the hot rolling is preferably performed at a temperature of 940° C. or less.

At the time of the finish rolling in the hot rolling, when a rolling reduction at each stand satisfies a following Equation C, a high value of λ×TS is obtained.

$$(r_1+r_2+r_3)/(r_{n-2}+r_{n-1}+r_n)>1.6 \quad \text{(Equation C)}.$$

Here, the number of a total stands of the hot finish rolling is n stage and $r_i\%$ is the rolling reduction of the $i^{th}$ stand.

Figure 3:
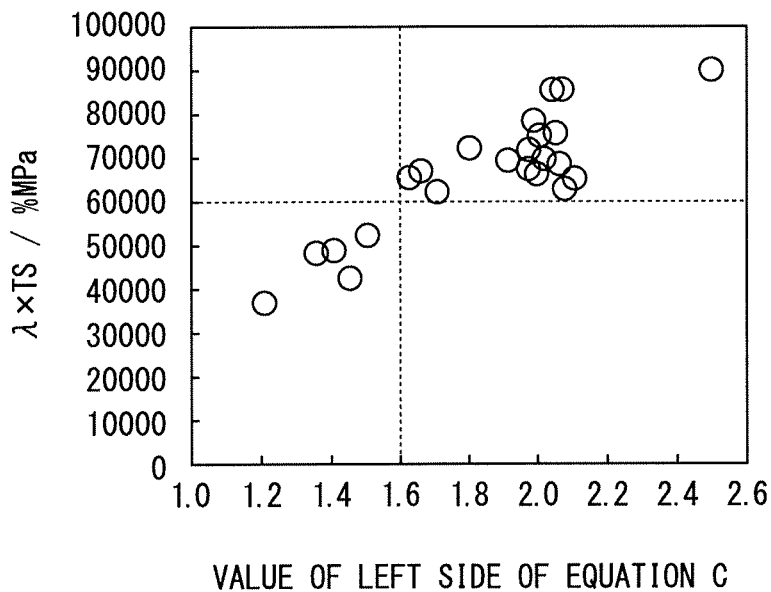
FIG. 3 is a view showing a relationship between a value of the left side of an Equation C, which represents a control state of a rolling reduction at the time of starting and ending of a hot finish rolling, and the value of λ×TS which estimates the strength and the formability of the steel sheet.

As shown in FIG. 3, there is a correlation between a value of the left side of the Equation C and a value of λ×TS. When the value of the left side of the Equation C exceeds 1.6, the value of λ×TS becomes 60,000% MPa or more. Accordingly, the value of the left side of the Equation C preferably exceeds 1.6. This is because it is assumed that the temperature of the material to be processed is high at the time of starting the finish rolling, and if the rolling reduction is high at this step, grains are uniform. On the other hand, since the temperature of the material to be processed is low at the time of ending the finish rolling, if the rolling reduction is high at this step, load to the material to be processed is increased, and disorder in the shape occurs. Furthermore, at this step, since the inner portion of the material to be processed has uneven temperature distribution, dispersion in the processing is increased, and material characteristics are deteriorated.

In order to securely obtain high strength and improved formability, it is preferable that $(r_1+r_2+r_3)/(r_{n-2}+r_{n-1}+r_n)>1.9$ be satisfied. Moreover, it is more preferable that $(r_1+r_2+r_3)/(r_{n-2}+r_{n-1}+r_n)>2.0$ be satisfied. On the other hand, due to limitations of a plant capacity, an upper limit of the value of $(r_1+r_2+r_3)/(r_{n-2}+r_{n-1}+r_n)$ becomes 3.0.

Figure 4:
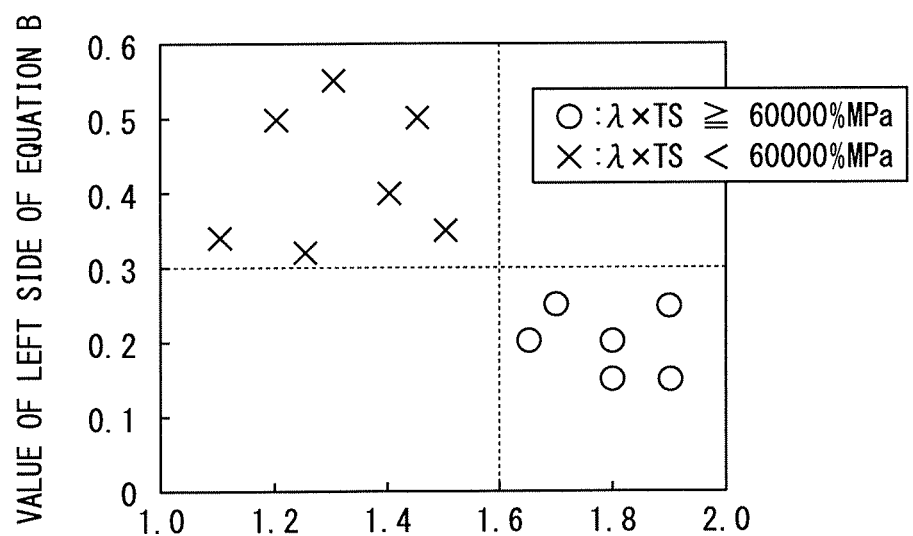
FIG. 4 is a view showing a relationship between the value of the left side of an Equation B, which represents the hardness of the martensite and the precipitation state of the MnS in the surface portion of the steel sheet and the center portion of the steel sheet, and the value of the left side of an Equation C which represents the control state of the rolling reduction at the time of starting and ending of the hot finish rolling.

Moreover, as shown in FIG. 4, there is a correlation between the value of the left side of the Equation B and the value of the left side of the Equation C. In FIG. 4, a steel sheet in which the value of λ×TS is 60,000% MPa or more is represented by "◯" and a steel sheet in which the value of λ×TS is less than 60,000% MPa is represented by "X". When both of the Equation B and the Equation C satisfy respective conditions, the value of λ×TS becomes 60,000% MPa or more. That is, when steel products which satisfy the above-described components are used and the rolling conditions represented by the Equation C are satisfied, the metallographic structure of the steel sheet is satisfied, and as a result, the value of λ×TS becomes 60,000% MPa or more.

Furthermore, if the value of EL×TS of the steel sheet is 16,000% MPa or more, since the hot-dip galvanized steel sheet is capable of being applied to an automotive members or the like in which strict workability is required, it is more preferable that the value of EL×TS be 16,000% MPa or more.

As a winding temperature of the steel sheet after the hot rolling is increased, recrystallization or grain growth is promoted, and the workability may be improved. However, as the winding temperature is increased, scales are generated, a pickling property is decreased. So, a ferrite and a pearlite are generated in layers, and thus, C is non-uniformly segregated. Accordingly, the winding temperature is set to 650° C. or less. On the other hand, if the winding temperature is too low, the steel sheet is hardened, and thus, a load at the time of cold rolling becomes high. Therefore, the winding temperature is set to 400° C. or more. Moreover, if necessary, the steel sheet after the hot rolling may be maintained at the winding temperature within a range of 1 hour or more and 24 hours or less. The steel sheet is maintained during the time, and thus, the metallographic structure of the hot rolling steel sheet is capable of being appropriately controlled.

If necessary, in a grinding process, in order to remove scales, surface grinding may be performed to the steel sheet after the hot rolling process. The grinding method is not particularly limited, and for example, a wire brush roll, an abrasive belt, a shot blasting, or the like may be used.

In a pickling process, the steel sheet after the hot rolling process or after the grinding process is pickled. The pickling method is not particularly limited, and an established pickling method which uses sulfuric acid, nitric acid, or the like may be used.

In a cold rolling process, the steel sheet after the pickling process is cold-rolled. The cold rolling method is not particularly limited. In the cold rolling, since shape correction of the steel sheet is difficult if the rolling reduction is low, the lower limit of the rolling reduction is preferably 30%. Moreover, if the rolling is performed at the rolling reduction exceeding 70%, due to an occurrence of cracks in an edge portion of the steel sheet and a deformation in the shape, the upper limit of the rolling reduction is preferably 70%.

In the cold rolled steel sheet which is manufactured through the hot rolling process and the cold rolling process described above, the hardness of the martensite and the precipitation state of the MnS in the steel sheet is more precisely controlled. Accordingly, the steel sheet is preferably used as the substrate of the hot-dip galvanized steel sheet.

In an annealing process, the steel sheet after the cold rolling process is annealed at the temperature of Ac1 (a temperature in which an austenite starts to be generated at the time of heating) or more and Ac3 (a temperature in which transformation from a ferrite to an austenite is completed at the time of heating) +100° C. or less. At the temperature less than Ac1, the structure is nonuniform. On the other hand, at the temperature exceeding Ac3+100° C., ferrite generation is suppressed due to coarsening of the austenite, and elongation characteristics are deteriorated. Moreover, from an economical aspect, the annealing temperature is preferably 900° C. or less. Moreover, during the annealing process, in order to make layered structures disappear, the steel sheet is needed to be maintained for more than 30 seconds. However, even when the steel sheet is maintained more than 30 minutes, the effects are saturated, and thus, the productivity is decreased. Accordingly, the maintaining duration is set to 30 seconds or more and 30 minutes or less.

In a cooling process, the steel sheet, which is heated within the temperature range in the annealing process, is cooled. A cooling end temperature is set to 600° C. or less. If the cooling end temperature exceeds 600° C., the austenite easily remains, problems about the secondary workability and the delayed fracture may easily occur. Furthermore, if necessary, at the cooling end temperature, the steel sheet after the annealing process may be maintained within a range of 10 seconds or more and 1000 seconds or less. According to the maintenance for the time, the metallographic structure of the steel sheet after the annealing process is capable of being appropriately controlled.

Moreover, in order to improve the hole expansibility and the brittleness, tempering treatment may be performed to the steel sheet at temperature of 600° C. or less after the cooling process, if necessary. Even when the tempering treatment is performed, effects of the present invention are not changed.

In a plating process, hot-dip galvanizing is performed to the steel sheet after the cooling process or the tempering treatment. A hot-dip galvanizing method is not particularly limited. Moreover, if necessary, an alloying treatment is performed, and thus, a galvannealing may be used.

Example 1

Steel having the component composition shown in Table 1 was casted in a vacuum melting furnace. In Table 1, underlined numerical values indicate values outside the range of the present invention. The steel products were heated to 1200° C. and the hot rolling was performed. The finish rolling in the hot rolling was performed at 880° C. Moreover, in the hot finish rolling, the rolling reduction was controlled at each stand. After the hot finish rolling ends, the rolling steel sheet was cooled to 500° C. and was maintained for 1 hour at the temperature, and the winding heat treatment of the hot rolling was performed. The surface scales of the obtained hot rolled steel sheet were removed by grinding and pickling. Thereafter, the cold rolling was performed to the steel sheet. Annealing was performed to the steel sheet after the cold rolling for 60 seconds at 800° C. by using a continuous annealing simulator. Thereafter, the steel sheet was cooled at a temperature range of 400° C. to 600° C. and maintained for 10 seconds to 600 seconds at the temperature. Hot-dip galvanizing was performed to the steel sheet, and if necessary, some of the steel sheets were cooled down to a room temperature after being treated by the alloying treatment.

A tensile test and a hole expansion test were performed using the hot-dip galvanized steel sheet manufactured described above. When the product of the hole expansion ratio λ(%)×the tensile strength TS (MPa) was 60,000% MPa or more, it was determined that the steel sheet had high strength and improved formability. The tensile test was performed by JIS No. 5 specimen. The hole expansion test is performed by pushing a conical punch having a tip angle of 60° into a punched hole which is provided on the specimen and has an initial hole diameter $d_0$: 10 (mm), and by expanding the punching hole. Moreover, the hole diameter d (mm) was measured at the time when cracks generated at a circumference of the punched hole penetrate in a sheet thickness direction of the specimen, and the hole expansion ratio λ was obtained by a following Equation D.

$$\lambda = [(d-d_0)/d_0] \times 100 (\%) \quad \text{(Equation D)}$$

Here, $d_0$=10 mm.

The metallographic structure of the hot-dip galvanized steel sheet manufactured as described above was observed by an optical microscope. An observed surface was a cutting section which was cut into a plane face along the sheet thickness direction so that a sheet width direction perpendicular to the rolling direction of the hot-dip galvanized steel sheet was the observed surface. The Ferrite was observed by NITAL etching and the martensite was observed by Le Pera etching method. A position of ¼ of the thickness of the steel sheet, which was positioned at the steel sheet side from an interface which was shown on the cutting section and was between the steel sheet and the hot-dip galvanized layer, was observed, and area fractions of the ferrite and the martensite were obtained. After the surface of the hot-dip galvanized steel sheet was ground in a parallel manner to the depth which was ¼ of the sheet thickness of the steel sheet, a polished surface was measured by an X-ray diffractometer, and thus, the volume faction of the austenite was obtained.

A galvanizing property was estimated by performing hot-dip galvanizing to the rolling steel sheet, which was subjected to annealing under the annealing conditions similar to the above-described conditions, using a hot-dip galvanizing simulator, and by visually confirming an attachment situation of the plating. A case where the plated surface was 90 area % or more and the galvanizing was uniformly attached was represented by "Good", and a case where the plated surface was more than 10 area % and defects existed was represented by "Bad". The results are shown in Table 2.

An observation of the precipitation state of MnS was performed by using a Field Emission-Scanning Electron Microscope (Fe-SEM). The observation was performed at the surface portion of the steel sheet which was ⅛ to ⅜ in the sheet thickness direction of the steel sheet from the interface, which was shown on the cutting section and between the steel sheet and the hot-dip galvanized layer, to the steel sheet side, and at the center portion of the steel sheet which was ⅜ to ⅝ in the sheet thickness direction of the steel sheet. A Magnification of the observation was set to 1,000 times, and an area of 0.12 mm×0.09 mm=0.01 mm² was set to one observation visual filed. A total of 10 visual fields were observed, and the number of the MnS was measured. Here, a total of 10 visual fields for every area of 0.01 mm² were observed, the total number was measured, and thus, the number of the MnS was represented by the number per 0.1 mm². An equivalent circle diameter (μm) of the MnS was calculated by an image analysis software in which the equivalent circle diameters in the 10 visual fields were incorporated into the Fe-SEM, the average value in the 10 visual field was obtained, and thus, the average value was set to the average equivalent circle diameter (μm).

The hardness of the martensite was measured using a nanoindenter. Grains of the martensite, which existed on the surface portion of the steel sheet and the center portion of the steel sheet, were measured at total 30 points with intervals of 100 μm, and the average value was obtained. The results were shown in Table 3. In Table 3, underlined numerical values indicate values outside the range of the present invention.

As shown in Tables 1 to 3, No. 1 to 27, which are Examples, are hot-dip galvanized steel sheets which have improved the galvanizability, the high strength, and sufficient hole expansibility (formability).

On the other hand, Nos. 28 to 45, which are Comparative Examples, are hot-dip galvanized steel sheets outside the range of the present invention.

In Comparative Examples 28 and 29, since the C content is outside the range of the present invention, the value of λ×TS becomes less than 60,000% MPa.

In Comparative Example 30, since the Si content is outside the range of the present invention, the value of Si+Al by mass % also is outside the range of the present invention, and thus, the value of λ×TS becomes less than 60,000% MPa, and the galvanizing property is also not good.

In Comparative Example 31, since the Si content and the Mn content are outside the range of the present invention and the value of Si+Al by mass % also is outside the range of the present invention, the value of λ×TS becomes less than 60,000% MPa, and galvanizing property is also not good.

In Comparative Example 32, since the Mn content is outside the range of the present invention, the value of λ×TS becomes less than 60,000% MPa.

In Comparative Example 33, since the P content is outside the range of the present invention, the value of λ×TS becomes less than 60,000% MPa.

In Comparative Example 34, since the S content is outside the range of the present invention, the value of λ×TS becomes less than 60,000% MPa.

In Comparative Example 35, since the N content is outside the range of the present invention, the value of λ×TS becomes less than 60,000% MPa.

In Comparative Example 36, since the Al content is outside the range of the present invention, the value of λ×TS becomes less than 60,000% MPa.

In Comparative Examples 37 to 41, since the value of Si+Al by mass % is outside the range of the present invention, the value of λ×TS becomes less than 60,000% MPa.

In Comparative Examples 42 to 45, since the Equation B and the Equation C are not satisfied, the value of λ×TS becomes less than 60,000% MPa.

TABLE 1

| | | Chemical Component (mass %) | | | | | | | | | | | | | | | |
|---|---|---|---|---|---|---|---|---|---|---|---|---|---|---|---|---|---|
| | | C | Si | Mn | P | S | N | Al | Cr | Mo | V | Ti | Nb | Ca | B | REM | Si + Al |
| Example | 1 | 0.051 | 0.250 | 1.65 | 0.005 | 0.008 | 0.0035 | 0.625 | — | — | — | — | — | — | — | — | 0.875 |
| | 2 | 0.052 | 0.202 | 2.02 | 0.023 | 0.006 | 0.0064 | 0.555 | — | — | — | — | — | — | — | — | 0.757 |
| | 3 | 0.055 | 0.288 | 2.50 | 0.008 | 0.009 | 0.0055 | 0.512 | — | 0.15 | — | — | — | — | — | — | 0.800 |
| | 4 | 0.061 | 0.421 | 1.52 | 0.007 | 0.007 | 0.0035 | 0.444 | — | — | — | — | — | — | — | — | 0.865 |
| | 5 | 0.052 | 0.256 | 1.55 | 0.008 | 0.008 | 0.0033 | 0.526 | 0.210 | 0.11 | — | — | — | — | — | — | 0.782 |
| | 6 | 0.111 | 0.222 | 1.69 | 0.006 | 0.009 | 0.0087 | 0.623 | — | — | — | — | — | 0.004 | — | — | 0.845 |
| | 7 | 0.125 | 0.650 | 1.52 | 0.032 | 0.005 | 0.0042 | 0.250 | — | 0.15 | — | — | — | — | — | — | 0.900 |
| | 8 | 0.079 | 0.256 | 1.53 | 0.044 | 0.001 | 0.0040 | 0.666 | 0.320 | 0.05 | — | — | — | 0.003 | — | — | 0.922 |
| | 9 | 0.095 | 0.475 | 1.62 | 0.008 | 0.002 | 0.0065 | 0.235 | — | — | — | — | — | — | — | — | 0.710 |
| | 10 | 0.077 | 0.245 | 1.77 | 0.007 | 0.009 | 0.0022 | 0.321 | — | 0.25 | — | — | — | — | — | — | 0.566 |
| | 11 | 0.091 | 0.321 | 1.56 | 0.006 | 0.007 | 0.0015 | 0.222 | — | 0.11 | — | — | — | — | — | — | 0.543 |
| | 12 | 0.095 | 0.356 | 2.09 | 0.012 | 0.006 | 0.0035 | 0.565 | — | 0.21 | — | — | — | — | — | — | 0.921 |
| | 13 | 0.105 | 0.215 | 1.82 | 0.011 | 0.005 | 0.0022 | 0.623 | 0.390 | — | — | — | — | — | — | — | 0.838 |
| | 14 | 0.101 | 0.235 | 2.68 | 0.009 | 0.008 | 0.0035 | 0.421 | — | 0.23 | — | — | — | — | 0.0015 | — | 0.656 |
| | 15 | 0.128 | 0.625 | 1.92 | 0.023 | 0.007 | 0.0034 | 0.368 | — | — | — | — | — | — | — | — | 0.993 |
| | 16 | 0.069 | 0.568 | 2.99 | 0.005 | 0.001 | 0.0024 | 0.251 | — | 0.05 | — | — | — | — | — | — | 0.819 |
| | 17 | 0.125 | 0.515 | 1.66 | 0.011 | 0.003 | 0.0037 | 0.121 | — | 0.11 | — | — | 0.01 | 0.002 | 0.0010 | — | 0.636 |
| | 18 | 0.111 | 0.458 | 2.03 | 0.016 | 0.004 | 0.0041 | 0.323 | — | — | — | — | 0.03 | — | — | — | 0.781 |
| | 19 | 0.124 | 0.256 | 1.93 | 0.013 | 0.007 | 0.0034 | 0.135 | — | 0.12 | — | — | — | — | — | 0.0020 | 0.391 |
| | 20 | 0.115 | 0.689 | 2.95 | 0.018 | 0.003 | 0.0025 | 0.223 | — | 0.21 | — | 0.03 | — | — | — | — | 0.912 |
| | 21 | 0.123 | 0.468 | 2.41 | 0.016 | 0.003 | 0.0064 | 0.356 | — | — | — | — | — | — | 0.0008 | — | 0.824 |
| | 22 | 0.115 | 0.452 | 2.19 | 0.014 | 0.005 | 0.0007 | 0.238 | — | — | — | — | — | — | — | — | 0.690 |
| | 23 | 0.125 | 0.264 | 1.54 | 0.013 | 0.003 | 0.0087 | 0.333 | 0.50 | 0.11 | — | 0.05 | — | — | — | — | 0.597 |
| | 24 | 0.126 | 0.521 | 2.35 | 0.022 | 0.007 | 0.0090 | 0.321 | — | — | — | — | — | — | 0.0015 | — | 0.842 |
| | 25 | 0.128 | 0.777 | 2.66 | 0.050 | 0.008 | 0.0069 | 0.215 | — | 0.15 | 0.03 | — | — | — | — | — | 0.992 |
| | 26 | 0.129 | 0.352 | 2.85 | 0.041 | 0.005 | 0.0065 | 0.356 | — | 0.22 | — | — | — | — | — | — | 0.708 |
| | 27 | 0.126 | 0.450 | 3.00 | 0.038 | 0.003 | 0.0034 | 0.369 | — | 0.31 | — | — | 0.02 | — | — | — | 0.819 |
| Comparative Example | 28 | 0.040 | 0.235 | 1.52 | 0.007 | 0.008 | 0.0035 | 0.521 | — | — | — | — | — | — | — | — | 0.756 |
| | 29 | 0.250 | 0.225 | 2.15 | 0.003 | 0.006 | 0.0007 | 0.512 | — | — | — | — | — | — | — | — | 0.737 |
| | 30 | 0.125 | 1.523 | 2.35 | 0.007 | 0.009 | 0.0035 | 0.356 | — | 0.15 | — | — | — | — | 0.0006 | — | 1.879 |
| | 31 | 0.116 | 1.498 | 1.30 | 0.009 | 0.003 | 0.0032 | 0.621 | 0.280 | 0.32 | — | — | — | — | — | — | 2.119 |
| | 32 | 0.112 | 0.235 | 3.25 | 0.009 | 0.004 | 0.0034 | 0.678 | — | — | — | — | — | — | — | — | 0.913 |
| | 33 | 0.099 | 0.321 | 2.12 | 0.075 | 0.003 | 0.0021 | 0.325 | 0.300 | 0.16 | — | — | — | 0.01 | — | — | 0.646 |
| | 34 | 0.062 | 0.455 | 2.50 | 0.002 | 0.020 | 0.0059 | 0.412 | — | — | — | — | — | — | — | — | 0.867 |
| | 35 | 0.055 | 0.356 | 1.55 | 0.011 | 0.010 | 0.0210 | 0.253 | — | — | — | — | — | 0.02 | — | — | 0.609 |
| | 36 | 0.125 | 0.500 | 1.95 | 0.018 | 0.004 | 0.0093 | 0.003 | — | 0.15 | — | — | — | — | — | — | 0.503 |
| | 37 | 0.126 | 0.210 | 2.65 | 0.005 | 0.003 | 0.0022 | 1.923 | — | 0.22 | — | — | — | — | — | — | 2.133 |
| | 38 | 0.078 | 0.120 | 2.10 | 0.008 | 0.003 | 0.0021 | 0.150 | — | — | — | — | — | — | — | — | 0.270 |
| | 39 | 0.128 | 0.920 | 2.35 | 0.008 | 0.003 | 0.0021 | 1.150 | — | 0.35 | — | — | 0.01 | — | — | — | 2.070 |
| | 40 | 0.122 | 0.220 | 2.15 | 0.007 | 0.003 | 0.0025 | 0.180 | — | — | — | — | — | — | — | — | 0.400 |
| | 41 | 0.115 | 0.650 | 2.22 | 0.008 | 0.002 | 0.0033 | 0.520 | — | — | — | — | — | — | — | — | 1.170 |
| | 42 | 0.110 | 0.350 | 2.06 | 0.056 | 0.003 | 0.0021 | 0.250 | — | 0.11 | — | — | — | 0.002 | — | — | 0.600 |
| | 43 | 0.078 | 0.520 | 1.55 | 0.046 | 0.002 | 0.0030 | 0.110 | — | — | — | — | — | — | — | — | 0.630 |
| | 44 | 0.130 | 0.620 | 2.39 | 0.051 | 0.006 | 0.0030 | 0.250 | — | 0.02 | — | — | — | 0.01 | — | — | 0.870 |
| | 45 | 0.121 | 0.220 | 2.25 | 0.005 | 0.003 | 0.0030 | 0.680 | 0.210 | 0.03 | — | — | — | — | 0.0010 | — | 0.900 |

*Underlined numerical values indicate values outside the range of the present invention.

TABLE 2

| | | Evaluation Result | | | | | | | |
|---|---|---|---|---|---|---|---|---|---|
| | | Tensile Test and Hole Extpansiblity Test | | | | | Metallographic Structure | | |
| | | | | | | | | | Residual |
| | | Tensile Strength (MPa) | Elongation (%) | Hole Expansibility (%) | EL × TS (% MPa) | λ × TS (% MPa) | Ferrite Fraction (area %) | Martensite Fraction (area %) | Austenite Fraction (volume %) | Galvanizing Property |
| Example | 1 | 577 | 33.2 | 105 | 19156 | 60585 | 68 | 22 | 2 | Good |
| | 2 | 576 | 32.5 | 125 | 18720 | 72000 | 68 | 23 | 3 | Good |
| | 3 | 585 | 31.2 | 110 | 18252 | 64350 | 69 | 22 | 4 | Good |
| | 4 | 622 | 28.0 | 106 | 17416 | 65932 | 65 | 25 | 3 | Good |
| | 5 | 777 | 22.3 | 95 | 17327 | 73815 | 64 | 26 | 4 | Good |
| | 6 | 798 | 23.2 | 86 | 18514 | 68628 | 59 | 33 | 3 | Good |
| | 7 | 802 | 22.3 | 77 | 17885 | 61754 | 58 | 31 | 5 | Good |
| | 8 | 832 | 20.5 | 74 | 17056 | 61568 | 59 | 30 | 3 | Good |
| | 9 | 845 | 20.0 | 72 | 16900 | 60840 | 55 | 31 | 4 | Good |
| | 10 | 855 | 21.0 | 75 | 17955 | 64125 | 52 | 31 | 3 | Good |
| | 11 | 901 | 20.0 | 71 | 18020 | 63971 | 52 | 36 | 4 | Good |
| | 12 | 978 | 18.5 | 70 | 18093 | 68460 | 52 | 32 | 2 | Good |
| | 13 | 985 | 16.5 | 66 | 16253 | 65010 | 51 | 35 | 3 | Good |
| | 14 | 990 | 16.5 | 62 | 16335 | 61380 | 50 | 34 | 4 | Good |

TABLE 2-continued

| | | Tensile Test and Hole Expansiblity Test | | | | Metallographic Structure | | Residual | |
|---|---|---|---|---|---|---|---|---|---|
| | | Tensile Strength (MPa) | Elongation (%) | Hole Expansibility (%) | EL × TS (% MPa) | λ × TS (% MPa) | Ferrite Fraction (area %) | Martensite Fraction (area %) | Austenite Fraction (volume %) | Galvanizing Property |
| | 15 | 995 | 17.1 | 62 | 17015 | 61690 | 52 | 36 | 3 | Good |
| | 16 | 1000 | 16.3 | 65 | 16300 | 65000 | 55 | 38 | 3 | Good |
| | 17 | 1002 | 16.4 | 66 | 16433 | 66132 | 52 | 41 | 3 | Good |
| | 18 | 1005 | 16.3 | 68 | 16382 | 68340 | 51 | 36 | 4 | Good |
| | 19 | 1008 | 16.4 | 61 | 16531 | 61488 | 48 | 38 | 4 | Good |
| | 20 | 1012 | 19.2 | 65 | 19430 | 65780 | 44 | 41 | 3 | Good |
| | 21 | 1022 | 18.5 | 60 | 18907 | 61320 | 42 | 42 | 5 | Good |
| | 22 | 1023 | 17.2 | 67 | 17596 | 68541 | 37 | 44 | 4 | Good |
| | 23 | 1045 | 16.5 | 62 | 17243 | 64790 | 36 | 46 | 2 | Good |
| | 24 | 1055 | 18.3 | 59 | 19307 | 62245 | 41 | 41 | 2 | Good |
| | 25 | 1252 | 13.5 | 55 | 16902 | 68860 | 30 | 48 | 2 | Good |
| | 26 | 1356 | 12.3 | 51 | 16679 | 69156 | 15 | 62 | 2 | Good |
| | 27 | 1512 | 11.3 | 50 | 17086 | 75600 | 12 | 75 | 2 | Good |
| Comparative | 28 | 405 | 32.1 | 65 | 13001 | 26325 | 92 | 0 | 3 | Good |
| Example | 29 | 1589 | 8.5 | 21 | 13507 | 33369 | 5 | 90 | 4 | Good |
| | 30 | 985 | 18.9 | 52 | 18617 | 51220 | 44 | 42 | 2 | Bad |
| | 31 | 901 | 21.5 | 55 | 19372 | 49555 | 55 | 32 | 2 | Bad |
| | 32 | 1215 | 11.0 | 25 | 13365 | 30375 | 30 | 52 | 3 | Good |
| | 33 | 804 | 21.3 | 45 | 17125 | 36180 | 51 | 37 | 3 | Good |
| | 34 | 602 | 24.6 | 74 | 14809 | 44548 | 68 | 21 | 4 | Good |
| | 35 | 596 | 21.3 | 58 | 12695 | 34568 | 69 | 21 | 4 | Good |
| | 36 | 1352 | 10.5 | 33 | 14196 | 44616 | 21 | 68 | 4 | Good |
| | 37 | 1367 | 10.3 | 32 | 14080 | 43744 | 22 | 69 | 3 | Bad |
| | 38 | 877 | 16.5 | 45 | 14471 | 39465 | 25 | 65 | 3 | Good |
| | 39 | 985 | 17.2 | 45 | 16942 | 44325 | 72 | 11 | 4 | Bad |
| | 40 | 1025 | 14.5 | 52 | 14863 | 53300 | 32 | 21 | 3 | Good |
| | 41 | 1052 | 17.6 | 41 | 18515 | 43132 | 56 | 12 | 5 | Bad |
| | 42 | 1002 | 17.5 | 32 | 17535 | 32064 | 42 | 30 | 3 | Good |
| | 43 | 765 | 23.2 | 35 | 17748 | 26775 | 52 | 36 | 4 | Good |
| | 44 | 885 | 10.2 | 42 | 9027 | 37170 | 48 | 38 | 3 | Good |
| | 45 | 987 | 13.2 | 40 | 13028 | 39480 | 45 | 42 | 4 | Good |

TABLE 3

| | | Evaluation Result Metallographic Structure | | | | | | |
|---|---|---|---|---|---|---|---|---|
| | | Surface Portion of Steel Sheet | | | Center Portion of Steel Sheet | | | |
| | | MnS | | | MnS | | | |
| | | Number of MnS $n_1$ (/0.1 mm$^2$) | Average Equivalent Circle Diameter $d_1$ (μm) | Martensite Hardness $H_1$ (GPa) | Number of MnS $n_2$ (/0.1 mm$^2$) | Average Equivalent Circle Diameter $d_2$ (μm) | Martensite Hardness $H_2$ (GPa) | Value of Left Side of Equation B |
| Example | 1 | 6 | 3 | 250 | 8 | 4 | 270 | 0.12 |
| | 2 | 4 | 2 | 270 | 7 | 4 | 290 | 0.21 |
| | 3 | 4 | 1 | 260 | 6 | 2 | 280 | 0.19 |
| | 4 | 5 | 2 | 280 | 7 | 3 | 310 | 0.19 |
| | 5 | 7 | 2 | 290 | 8 | 2 | 300 | 0.04 |
| | 6 | 7 | 1 | 320 | 7 | 1 | 330 | 0.03 |
| | 7 | 6 | 3 | 320 | 9 | 3 | 330 | 0.04 |
| | 8 | 6 | 4 | 340 | 7 | 5 | 360 | 0.08 |
| | 9 | 6 | 3 | 400 | 10 | 7 | 430 | 0.24 |
| | 10 | 6 | 4 | 400 | 8 | 5 | 420 | 0.07 |
| | 11 | 6 | 3 | 410 | 9 | 3 | 420 | 0.03 |
| | 12 | 8 | 4 | 410 | 9 | 6 | 460 | 0.19 |
| | 13 | 8 | 2 | 420 | 10 | 3 | 450 | 0.12 |
| | 14 | 9 | 4 | 420 | 13 | 5 | 440 | 0.07 |
| | 15 | 11 | 2 | 430 | 12 | 3 | 440 | 0.04 |
| | 16 | 7 | 2 | 410 | 10 | 5 | 430 | 0.15 |
| | 17 | 6 | 1 | 440 | 8 | 3 | 460 | 0.16 |
| | 18 | 8 | 2 | 430 | 10 | 2 | 440 | 0.03 |
| | 19 | 9 | 4 | 420 | 10 | 6 | 440 | 0.07 |

TABLE 3-continued

|  |  |  |  |  |  |  |  |  |
|---|---|---|---|---|---|---|---|---|
|  | 20 | 7 | 3 | 420 | 8 | 3 | 450 | 0.08 |
|  | 21 | 8 | 2 | 440 | 9 | 2 | 470 | 0.07 |
|  | 22 | 6 | 4 | 440 | 10 | 4 | 480 | 0.12 |
|  | 23 | 10 | 2 | 440 | 12 | 2 | 460 | 0.05 |
|  | 24 | 10 | 5 | 450 | 14 | 6 | 470 | 0.07 |
|  | 25 | 12 | 3 | 450 | 14 | 4 | 470 | 0.06 |
|  | 26 | 14 | 5 | 460 | 16 | 7 | 480 | 0.07 |
|  | 27 | 16 | 6 | 470 | 20 | 10 | 500 | 0.12 |
| Comparative Example | 28 | 6 | 3 | 240 | 8 | 4 | 270 | 0.19 |
|  | 29 | 12 | 7 | 510 | 14 | 8 | 520 | 0.02 |
|  | 30 | 7 | 3 | 400 | 8 | 5 | 420 | 0.09 |
|  | 31 | 8 | 4 | 410 | 9 | 5 | 430 | 0.06 |
|  | 32 | 6 | 3 | 430 | 10 | 6 | 460 | 0.19 |
|  | 33 | 4 | 3 | 380 | 6 | 6 | 400 | 0.13 |
|  | 34 | 6 | 4 | 300 | 8 | 6 | 320 | 0.12 |
|  | 35 | 7 | 4 | 300 | 9 | 5 | 330 | 0.14 |
|  | 36 | 10 | 5 | 450 | 12 | 7 | 480 | 0.10 |
|  | 37 | 10 | 3 | 460 | 13 | 5 | 500 | 0.17 |
|  | 38 | 20 | 9 | 400 | 24 | 13 | 420 | 0.08 |
|  | 39 | 10 | 7 | 420 | 12 | 9 | 440 | 0.07 |
|  | 40 | 12 | 6 | 420 | 15 | 8 | 480 | 0.21 |
|  | 41 | 11 | 6 | 420 | 13 | 9 | 460 | 0.15 |
|  | 42 | 10 | 7 | 420 | 16 | 14 | 470 | <u>0.31</u> |
|  | 43 | 9 | 8 | 380 | 15 | 15 | 430 | <u>0.33</u> |
|  | 44 | 8 | 8 | 390 | 10 | 15 | 450 | <u>0.31</u> |
|  | 45 | 8 | 7 | 410 | 14 | 15 | 460 | <u>0.36</u> |

| | | | Manufacturing Condition | | | | | |
|---|---|---|---|---|---|---|---|---|
| | | | Rolling reduction in Hot Finish Rolling | | | | | Value of |
| | | | $r_1$ (%) | $r_2$ (%) | $r_3$ (%) | $r_{n-2}$ (%) | $r_{n-1}$ (%) | $r_n$ (%) | Left Side of Equation C |
| Example | 1 | | 51 | 40 | 38 | 30 | 29 | 12 | 1.82 |
| | 2 | | 50 | 40 | 38 | 30 | 25 | 20 | 1.71 |
| | 3 | | 51 | 38 | 30 | 29 | 28 | 4 | 1.95 |
| | 4 | | 42 | 37 | 33 | 30 | 27 | 7 | 1.75 |
| | 5 | | 49 | 39 | 35 | 29 | 22 | 8 | 2.08 |
| | 6 | | 45 | 39 | 45 | 25 | 23 | 4 | 2.48 |
| | 7 | | 49 | 39 | 35 | 23 | 21 | 7 | 2.41 |
| | 8 | | 49 | 38 | 36 | 30 | 21 | 8 | 2.08 |
| | 9 | | 43 | 40 | 36 | 27 | 24 | 8 | 2.02 |
| | 10 | | 45 | 16 | 34 | 28 | 24 | 7 | 1.61 |
| | 11 | | 43 | 40 | 36 | 28 | 25 | 6 | 2.02 |
| | 12 | | 46 | 45 | 33 | 25 | 23 | 4 | 2.38 |
| | 13 | | 48 | 40 | 35 | 23 | 20 | 8 | 2.41 |
| | 14 | | 47 | 41 | 35 | 28 | 23 | 8 | 2.08 |
| | 15 | | 51 | 40 | 38 | 30 | 25 | 16 | 1.82 |
| | 16 | | 42 | 36 | 34 | 30 | 26 | 8 | 1.75 |
| | 17 | | 42 | 36 | 34 | 32 | 26 | 6 | 1.75 |
| | 18 | | 50 | 40 | 39 | 30 | 27 | 14 | 1.82 |
| | 19 | | 51 | 38 | 30 | 29 | 27 | 5 | 1.95 |
| | 20 | | 47 | 41 | 35 | 29 | 23 | 7 | 2.08 |
| | 21 | | 43 | 41 | 36 | 27 | 24 | 8 | 2.03 |
| | 22 | | 43 | 41 | 36 | 24 | 27 | 8 | 2.03 |
| | 23 | | 49 | 41 | 35 | 28 | 23 | 8 | 2.12 |
| | 24 | | 46 | 45 | 33 | 25 | 23 | 4 | 2.38 |
| | 25 | | 47 | 41 | 35 | 29 | 23 | 7 | 2.08 |
| | 26 | | 51 | 38 | 30 | 29 | 28 | 4 | 1.95 |
| | 27 | | 43 | 41 | 36 | 24 | 27 | 8 | 2.03 |
| Comparative Example | 28 | | 47 | 41 | 35 | 28 | 23 | 8 | 2.08 |
| | 29 | | 49 | 39 | 35 | 26 | 22 | 8 | 2.20 |
| | 30 | | 49 | 39 | 35 | 24 | 22 | 8 | 2.28 |
| | 31 | | 49 | 39 | 35 | 26 | 22 | 8 | 2.20 |
| | 32 | | 43 | 41 | 36 | 24 | 27 | 8 | 2.03 |
| | 33 | | 51 | 38 | 40 | 30 | 29 | 12 | 1.82 |
| | 34 | | 51 | 38 | 30 | 29 | 28 | 4 | 1.95 |
| | 35 | | 42 | 37 | 33 | 27 | 30 | 7 | 1.75 |
| | 36 | | 51 | 40 | 38 | 30 | 29 | 12 | 1.82 |
| | 37 | | 43 | 41 | 36 | 27 | 24 | 8 | 2.03 |
| | 38 | | 49 | 39 | 35 | 26 | 20 | 10 | 2.20 |
| | 39 | | 49 | 39 | 35 | 24 | 22 | 8 | 2.28 |
| | 40 | | 48 | 40 | 35 | 24 | 22 | 8 | 2.28 |
| | 41 | | 43 | 41 | 36 | 27 | 22 | 10 | 2.03 |
| | 42 | | 45 | 22 | 43 | 30 | 34 | 13 | <u>1.43</u> |
| | 43 | | 38 | 30 | 29 | 43 | 33 | 7 | <u>1.17</u> |

TABLE 3-continued

| | | | | | | | |
|---|---|---|---|---|---|---|---|
| 44 | 45 | 43 | 22 | 34 | 30 | 13 | <u>1.43</u> |
| 45 | 48 | 36 | 18 | 40 | 35 | 7 | <u>1.24</u> |

*Underlined numerical values indicate values outside the range of the present invention.

INDUSTRIAL APPLICABILITY

According to the hot-dip galvanized steel sheet and the manufacturing method thereof of the aspects of the present invention, in the steel sheet which becomes a substrate of the hot-dip galvanized steel sheet, by controlling a total amount of Si and Al, which are components of the steel sheet, to a specific range, and by controlling the hardness of the martensite and a precipitation state of the MnS of the steel sheet, a hot-dip galvanized steel sheet having high strength and improved formability and a manufacturing method thereof is capable of being provided.

The invention claimed is:

1. A hot-dip galvanized steel sheet comprising:
a steel sheet; and
a hot-dip galvanized layer arranged on the steel sheet,
wherein a component of the steel sheet includes, by mass %,
C: 0.05% to 0.13%,
Si: 0.2% to 0.6%,
Mn: 1.5% to 3.1%,
P: 0.001% to 0.06%,
S: 0.001% to 0.01%,
N: 0.0005% to 0.01%,
Al: 0.1% to 0.7%,
and a balance including Fe and unavoidable impurities,
wherein a content of the Si and a content of the Al by mass % satisfy a following Equation A,
wherein the steel sheet has a tensile strength TS of 500 MPa or more and less than 800 MPa and a hole expansion ratio λ×TS is 60,000% MPa or more, and a metallographic structure of the steel sheet includes a ferrite and a martensite,
wherein a fraction of the ferrite is 50 area % to 90 area % and a fraction of the martensite is 10 area % to 40 area %,
wherein the metallographic structure satisfies a following Equation B,
wherein $n_1$ represents a number of a MnS per 0.1 mm² on a surface portion of the steel sheet which is a region of ⅛ to ⅜ in a sheet thickness direction,
$d_1$ represents, in μm, an average equivalent circle diameter of the MnS on the surface portion of the steel sheet,
$H_1$ represents, in GPa, a hardness of the martensite of the surface portion of the steel sheet,
$n_2$ represents the number of the MnS per 0.1 mm² on a center portion of the steel sheet which is a region of ⅜ to ⅝ in the sheet thickness direction,
$d_2$ represents, in μm, the average equivalent circle diameter of the MnS on the center portion of the steel sheet, and
$H_2$ represents, in GPa, the hardness of the martensite of the center portion of the steel sheet:

$$0.5 < Si + Al < 1.0 \quad \text{(Equation A)};$$

$$\{(n_2)^{2/3} \times d_2\}/\{(n_1)^{2/3} \times d_1\} \times \ln(H_2/H_1) < 0.3 \quad \text{(Equation B)}.$$

2. The hot-dip galvanized steel sheet according to claim 1, wherein the component of the steel sheet further includes, by mass %, at least one of
B: 0.0005% to 0.002%,
Mo: 0.01% to 0.5%,
Cr: 0.01% to 0.5%,
V: 0.001% to 0.1%,
Ti: 0.001% to 0.1%,
Nb: 0.001% to 0.05%,
Ca: 0.0005% to 0.005%, and
Rare Earth Metal: 0.0005% to 0.005%.

3. The hot-dip galvanized steel sheet according to claim 2, wherein the steel sheet is a cold rolled steel sheet.

4. The hot-dip galvanized steel sheet according to claim 1, wherein the steel sheet is a cold rolled steel sheet.

5. A manufacturing method of the hot-dip galvanized steel sheet according to claim 1,
wherein, when a total number of stands on a hot finish rolling is n stage, and $r_i$% is a rolling reduction at the $i^{th}$ stand, the hot finish rolling satisfies a following Equation C, $$(r_1 + r_2 + r_3)/(r_{n-2} + r_{n-1} + r_n) > 1.6 \quad \text{(Equation C)}.$$

6. A manufacturing method of the hot-dip galvanized steel sheet according to claim 2,
wherein, when a total number of stands on a hot finish rolling is n stage, and $r_i$% is a rolling reduction at the $i^{th}$ stand, the hot finish rolling satisfies a following Equation C, $$(r_1 + r_2 + r_3)/(r_{n-2} + r_{n-1} + r_n) > 1.6 \quad \text{(Equation C)}.$$

7. A manufacturing method of the hot-dip galvanized steel sheet according to claim 3,
wherein, when a total number of stands on a hot finish rolling is n stage, and $r_i$% is a rolling reduction at the $i^{th}$ stand, the hot finish rolling satisfies a following Equation C, $$(r_1 + r_2 + r_3)/(r_{n-2} + r_{n-1} + r_n) > 1.6 \quad \text{(Equation C)}.$$

8. A manufacturing method of the hot-dip galvanized steel sheet according to claim 4,
wherein, when a total number of stands on a hot finish rolling is n stage, and $r_i$ is a rolling reduction at the $i^{th}$ stand, the hot finish rolling satisfies a following Equation C, $$(r_1 + r_2 + r_3)/(r_{n-2} + r_{n-1} + r_n) > 1.6 \quad \text{(Equation C)}.$$

* * * * *